United States Patent [19]

Blair

[11] 4,388,637

[45] Jun. 14, 1983

[54] VIDEO SIGNAL MONITORING DEVICE AND METHOD

[75] Inventor: Bruce A. Blair, Jackson, Mo.

[73] Assignee: Lenco, Inc., Jackson, Mo.

[21] Appl. No.: 271,703

[22] Filed: Jun. 8, 1981

[51] Int. Cl.³ .............................................. H04N 9/62
[52] U.S. Cl. ..................................................... 358/10
[58] Field of Search ..................... 358/10, 185, 17–19, 358/24, 139; 307/516, 236; 328/133, 150; 324/88, 83 A

[56] References Cited

U.S. PATENT DOCUMENTS

| | | | |
|---|---|---|---|
| 3,958,269 | 5/1976 | Davis | 358/10 |
| 4,024,571 | 5/1977 | Dischert et al. | 358/19 |
| 4,180,829 | 12/1979 | Pires | 358/10 |

FOREIGN PATENT DOCUMENTS 1182269  2/1970  United Kingdom ................... 358/18

OTHER PUBLICATIONS

Patchett, *Color Television with Particular Reference to the PAL System*, pp. 152,153, Norman Price (Publishers) Ltd., London, 1968.

*Primary Examiner*—John C. Martin
*Attorney, Agent, or Firm*—Haverstock, Garrett & Roberts

[57] ABSTRACT

A device and method for monitoring a video signal formed by a train of horizontal sync pulses including odd and even numbered sync pulses and intermittent color burst signal portions located between successive horizontal sync pulses including a circuit for generating a first continuous signal in phase with the color burst signal portions, a circuit for generating a second continuous signal in phase with the odd numbered horizontal sync pulses, a demodulator circuit for demodulating the first signal with the second signal to produce a third signal, and a display device for displaying a vertical line and the third signal as a sine wave with the phase of the sine wave with respect to the vertical line being representative of the color burst signal portion to horizontal sync pulse phasing of the video signal. The horizontal sync pulses and the color burst signal portions of a second video signal may additionally be displayed as a second vertical line and a second sine wave on the display device so that a second video signal in a video system may be compared with the aforementioned video signal.

42 Claims, 9 Drawing Figures

VIDEO SIGNAL MONITORING DEVICE AND METHOD

The present invention relates to a video signal monitoring device which gives a graphic display of the sync-to-burst phase relationship of a color video signal in order that the phase relationship may be adjusted to meet industry standards.

With the increasing use of video tape recorders in the television industry, it has become necessary to establish standards for the sync-to-burst phase relationship of a color video signal because once a color video signal has been recorded, the sync-to-burst phase relationship can no longer be altered. Thus, if the recorded signal is to be mixed with a live video signal or with another recorded video signal in a video system, it is necessary for satisfactory operation for the sync-to-burst phase relationship of all the video signals in the video system to be the same so that all of the video signals are in time with one another. To this end the television industry has proposed that a sync-to-burst phase relationship, defined in part of the EIA Industrial Electronics Tentative Standard No. 1 known as RS-170A, be adopted. These specifications state that if the reference burst in the color burst were extended 19 cycles towards the leading edge of sync, it would zero cross at the 50% point. Further, the extended burst will zero cross line 10 in each of the color fields and in the positive going direction in color field 1, negative going direction in color field 2, negative going direction in color field 3, and positive going direction in color field 4.

There is no known prior test equipment that can easily and accurately measure the sync-to-burst phase relationship commonly referred to as subcarrier-to-horizontal (SCH) phase. Even if a single cycle of the burst subcarrier of one of the color fields could be resolved and displayed, the 15 hz repetition rate of each color field gives only a very dim trace on even a high quality oscilloscope. Thus, measuring the SCH phase by an oscilloscope is not considered practical. Prior SCH phase meters operate only in a narrow phase angle near the leading edge of sync. This means that if a video signal is to be adjusted to the RS-170A specifications, the subcarrier phase of the video signal must be changed in a random manner until the range of a prior SCH phase meter is approached. There is also no known SCH phase meter which compares the output of any two video sources to establish that the sync-to-burst phase relationship of the video signals from the sources are in fact in time with one another. Another problem is that the point in a normal television studio where the SCH phase is measured is usually relatively far removed from the point in the studio where the phase relationship is actually controlled. As a result, two people are usually required to accomplish this, one for making the SCH phase measurements at one point, and a second person for actually making the adjustments.

In the device of the present invention, a reference video signal is fed into a precision sync strip circuit, which, among other things, generates a control signal having a pulse whose leading edge occurs at the beginning of the color burst of the reference video signal. The reference video signal is input with control signal into a reference SC (subcarrier) lock circuit having a 3.58 Mhz oscillator and a phase lock loop circuit which is controlled by the control signal to lock the output of the oscillator in phase with the reference burst. This results in a continuous reference SC signal being generated by the reference SC lock circuit which is in phase with the color burst portion of the reference video signal. If the sync-to-burst phasing is changed in the reference video signal, the reference SC signal stays in phase with the burst portion of the reference video signal.

An offset SC lock circuit is provided which has a 3.56425 Mhz oscillator and which generates an offset SC signal. The reference SC and the offset SC signals are fed into a chroma demodulator circuit whose output is a sine wave having a frequency of 15,750 Hz, which is the difference frequency between 3.58 Mhz and 3.564251 Mhz, and whose phase is dependent on the phase difference of the SC signals input into the chroma demodulator circuit. The demodulated sine wave has the same frequency as the scan rate of video monitors and commercial TV sets, and thus when the demodulated sine wave is rasterized and displayed on a TV screen, a single sine wave is displayed. If the offset SC signal is made to be in phase with a given point and mixed with the reference SC signal by a chroma demodulator circuit, the output of the chroma demodulator circuit will be a sine wave having the same phase relationship to the given point as the reference SC signal has to that point.

The point picked in operation of the present device is the positive going zero crossing of the demodulated sine wave displayed on the screen of a video monitor which is made to electrically correspond to the leading edge of the sync of the reference video signal. This is done by locking the offset SC signal in phase with the sync. Thus, if the sync-to-burst phasing of the reference video signal is changed, the offset SC signal stays in phase with the leading edge of the sync. The given point is located on the screen of a video monitor by the intersection of a vertical line and a horizontal line. When the reference SC signal and the offset SC signal are in phase at the leading edge of the sync, the intersection of the lines overlays the zero crossing of the demodulated sine wave. When the offset SC signal and the reference SC signal are out of phase, their phase difference is shown as the shift of the sine wave zero crossing from the intersection of the horizontal and vertical lines, which phase difference is related to the phase difference between the reference SC signal and the leading edge of the sync. This display is advantageous because it is a graphical representation of the intersection of the reference burst and the leading edge of sync if the burst is extended towards sync as set out in the RS-170A specifications.

The present device also has a second or match video signal fed into a match SC lock circuit which locks a 3.58 Mhz match SC signal in phase with the beginning of the color burst of the match video signal. The match SC signal is also demodulated by the chroma demodulator with the offset SC signal giving a second or match demodulated sine wave for display on a video monitor along with the first or reference demodulated sine wave and the intersecting lines.

The horizontal pulses of the match video signal are compared to a ramp generated by the horizontal pulses of the reference video signal producing a second vertical line for display on the video monitor showing the time difference between the horizontal pulses in the reference video signal and the horizontal pulses in the match video signal.

The sync-to-burst phasing of the reference video signal is adjusted until the reference sine wave zero crosses the first vertical line in the positive going direction. The timing and the sync-to-burst phasing of the match video signal is then adjusted until the second vertical line overlays the reference sine wave indicating that the reference video signal and the match video signal both meet the RS-170A specifications and that their sync-to-burst phasings are equal.

The output of the device is a composite video signal which may be easily transmitted to various points in a television studio and displayed on video monitors as desired.

Prior art devices that have been considered and are of some general interest to show the state of the art are disclosed in U.S. Pat. Nos. 3,310,625; 3,430,098; 3,646,254; 3,862,356; 3,958,269; 3,972,065; 4,052,733; 4,058,826; 4,145,706; and 4,180,829.

It is therefore a principal object of the present invention to teach the construction and operation of improved means for measuring and monitoring the sync-to-burst phasing in a video signal.

Another object is to teach the construction and operation of a means for comparing the sync-to-burst phasing of two video signals in a video system.

Another object is to teach the construction and operation of an SCH phase meter for use in certifying and maintaining the sync-to-burst phase relationship of a video signal in accordance with the RS-170A specifications.

Another object is to improve the station handling and airing of recorded video signals in a television broadcasting station.

Another object is to improve the handling and airing of recorded video signals such that they may be transmitted with live video signals for error free transmission by a television broadcasting station.

Another object is to teach the construction of an improved signal monitoring device which displays a single wave of a signal which is not observable on an oscilloscope.

Another object is to teach the construction and operation of an improved means for determining the phase relationship of an intermittent alternating electric signal and a given time which occurs when the intermittent alternative signal does not exist.

Another object is to teach the construction and operation of improved means for showing the phase relationship between a single wave of one electric signal and a single wave of a second electric signal.

Another object is to teach the construction and operation of means for selecting the desired half wave of a sine wave in an electrical signal.

Another object is to teach the construction and operation of a means for distinguishing even numbered sync pulses from odd numbered sync pulses in a video signal.

These and other objects and advantages of the present device will become apparent after considering the following detailed specification in conjunction with the accompanying drawings wherein.

Figure 1:
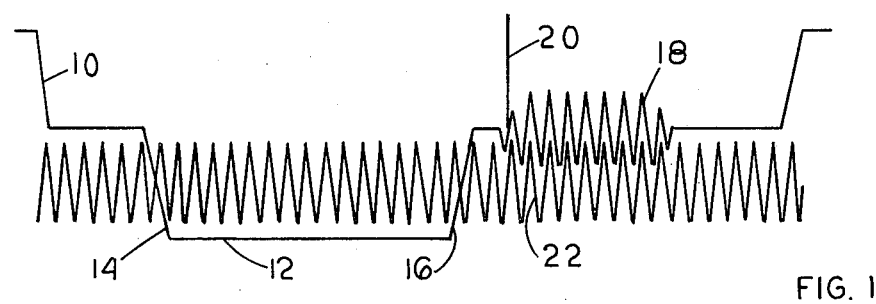
FIG. 1 is a drawing of a portion of a video signal showing a sync pulse, a color burst and a superimposed sine wave in phase with the color burst and extended toward the leading edge of the sync pulse.

Referring to the drawings more particularly by reference numbers, reference number 10 refers to the wave form of a video signal including a horizontal sync pulse 12 having a leading edge 14 and a trailing edge 16. The video signal 10 also has a color burst signal portion 18 having 9 cycles with a frequency of 3.58 Mhz. In the past the sync-to-burst phase relationship of the leading edge of sync 14 to the beginning 20 of the color burst signal 18 could be kept within specified tolerances for satisfactory performance. However, with the increased use of video recorders and the mixing of video signals, it is important that the sync-to-burst phasing be accurately controlled in order that recorded video signals and live video signals may be used together in programming the station transmissions without causing errors in the video picture resulting from the mixing of signals with different sync-to-burst phasing. The RS-170A specifications were thus proposed to standardize this phasing and require that the phase relationship between the color burst signal 18 be in phase with the leading edge 14 of the pulse 12. This task is difficult to achieve because at the time when the leading edge of sync pulse occurs, the color burst signal 18 does not exist.

Figure 2:
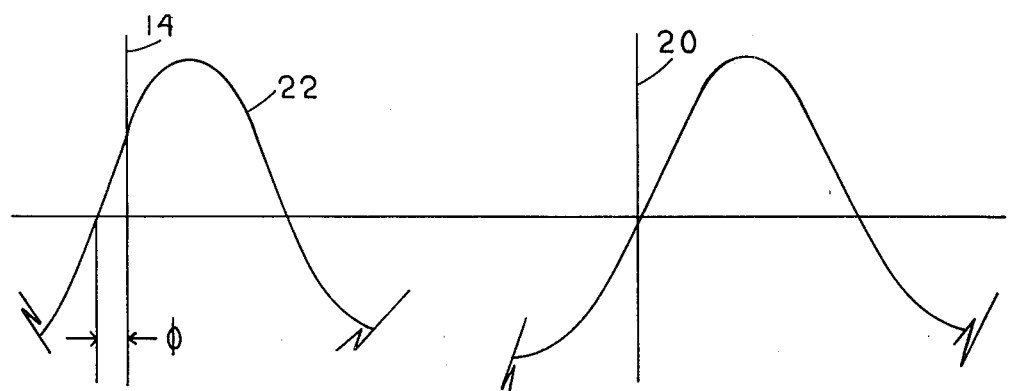
FIG. 2 shows two half-cycles of an alternating electrical signal which is in phase with the color burst of the video signal of FIG. 1.

As shown in FIG. 2, the present device generates a reference SC signal 22 at the same frequency and in phase with the color burst signal 18 such that its 50% point crosses the beginning 20 of the burst signal 18, and, when effectively extended backwards toward the beginning of the sync pulse 12, is out of phase with the beginning 14 of the sync pulse 12 by an angle $\phi$ to be determined and displayed by the device of the present invention.

Figure 3:
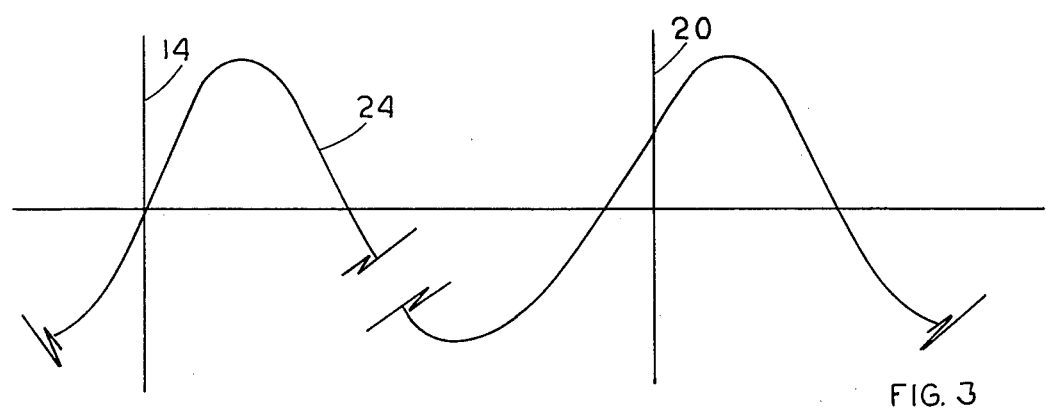
FIG. 3 shows two half cycles of an alternating electrical signal which is in phase with the sync pulse of the video signal of FIG. 1.
Figure 4:
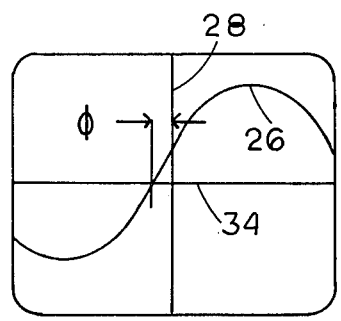
FIG. 4 is a diagramatic view of a picture displayed on a video monitor representing the sync-to-burst phase relationship of the reference video signal.

FIG. 3 shows two cycles of an offset SC signal 24 which is in phase with the leading edge 14 of the sync pulse 12 such that the signal 24 crosses the leading edge 14 at its 50% point. The frequency of the signal 24 is offset from the frequency of the reference SC signal 22 such that when the two signals 22 and 24 are modulated together, their difference is equal to 15,750 hz, which is also the scan rate of a video monitor. Thus, when the two signals 22 and 24 are demodulated together and their difference signal is displayed on a video monitor as shown in FIG. 4, a single cycle of a sine wave 26 will be displayed which is out of phase with a reference line 28, representing the leading edge 14 of the sync pulse 12, by the angle $\phi$.

Figure 5:
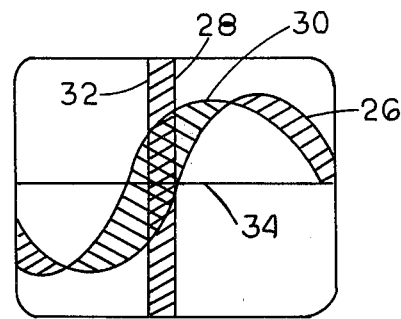
FIG. 5 is a diagramatic view of a picture displayed on a video monitor representing the sync-to-burst phase relationships of a reference video signal and a match video signal.

When a second or match video signal is fed into the device, a second sine wave 30 and a second vertical line 32 are displayed on the screen of the monitor as shown in FIG. 5. The distance between the lines 28 and 32 indicates the timing difference between the sync pulses of the two video signals, and the phase angle between the second sine wave 30 and the vertical line 32 indicates on the display the sync-to-burst phase relationship of the second video signal. The timing between the two video signals is adjusted such that the line 32 overlays the line 28 and the sync-to-burst phasings of the two signals are adjusted such that the sine wave 30 overlays sine wave 26 and the two sine waves 26 and 30 intersect the vertical lines 28 and 32 at their 50% points. When the two video signals are so adjusted, the timing between the video signals and their sync-to-burst phasings are the same and the signals may be transmitted together for error free transmission. A single horizontal line 34 is displayed across the center of the video monitor screen as shown in FIGS. 4 and 5 for showing the 50% point in the sine waves 26 and 30.

Figure 6:
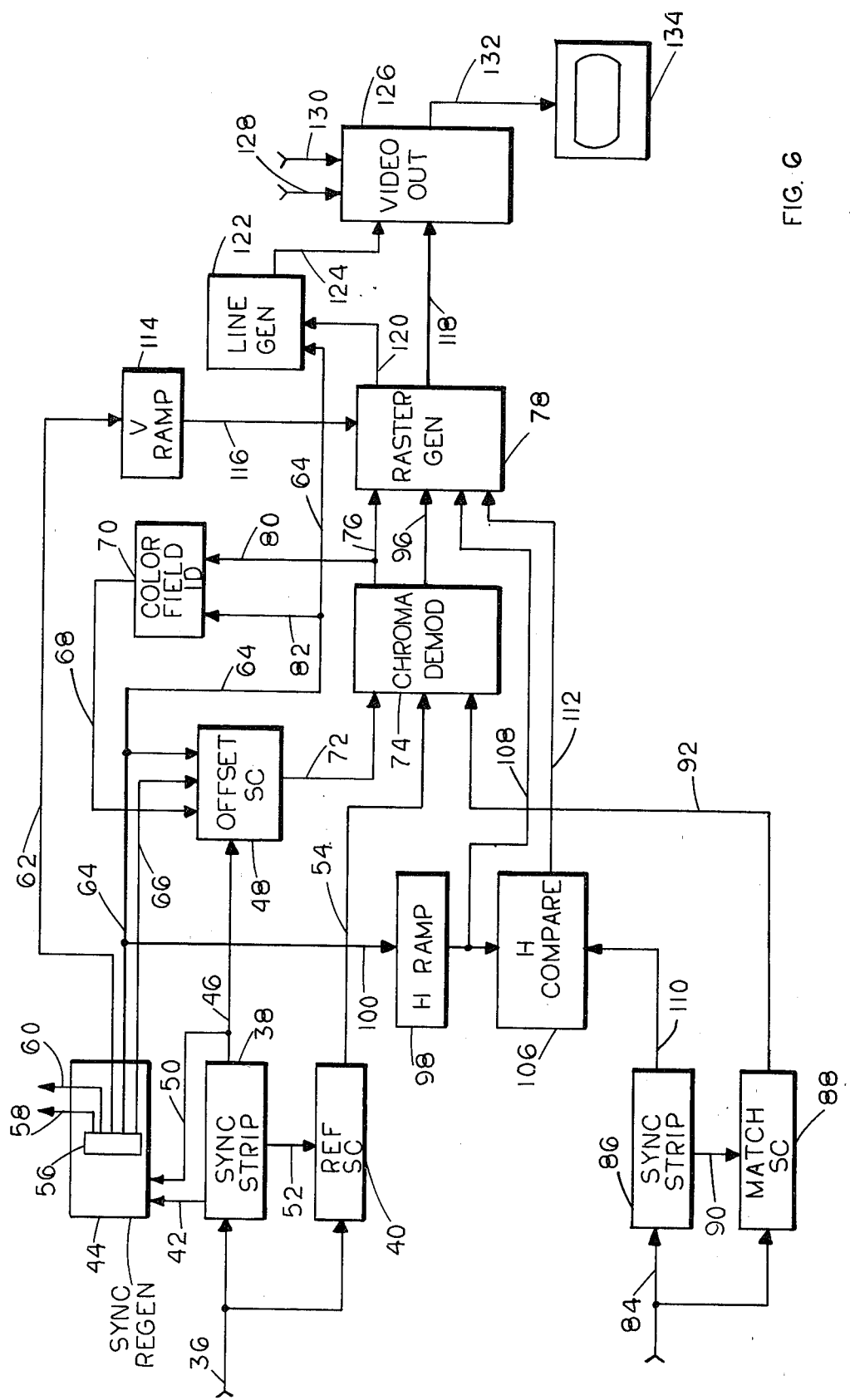
FIG. 6 is a schematic circuit diagram of one embodiment of the present invention.

FIG. 6 is a schematic diagram of one embodiment of the subject device wherein reference number 36 is an input lead for the reference video signal which is connected to a precision sync strip circuit 38 and a reference SC lock circuit 40. The precision sync strip circuit 38 strips the sync pulses, including the vertical and horizontal sync pulses, from the reference video signal on lead 36 and feeds them over the reference strip sync lead 42 to a sync regenerator circuit 44, and generates a train of output pulses, referred to herein as reference H-mark pulses, which are transmitted over lead 46 to an offset SC lock circuit 48 and over lead 50 to the sync regenerator circuit 44. The precision sync strip circuit 38 contains a delay circuit such that each pulse in the reference H-mark pulse train occurs 40 nanoseconds, plus or minus five nanoseconds, after the zero crossing of a horizontal sync pulse in the reference video signal. The precision sync strip circuit 38 also produces a train of burst control pulses each of which starts at the beginning of each color burst signal in the reference video signal. The control burst pulses are transmitted over lead 52 to the reference SC lock circuit 40. The reference SC lock circuit 40 includes a 3.58 Mhz oscillator and a phase lock loop controlled by the burst control pulses on the lead 52 such that a train of pulses having a frequency of 3.58 Mhz and in phase with the color burst signals on the video signal lead 36 is output on lead 54. The sync regenerator circuit 44 includes a sync generator integrated circuit chip 56 which is controlled by the vertical and horizontal sync pulses over lead 42 and the reference H-mark pulses over the lead 50 for regenerating a video signal which is in phase with the reference video signal on lead 36. The circuit chip 56 outputs include a regenerated sync signal on the lead 58, a blanking signal on the lead 60, a vertical drive signal on the lead 62, a horizontal drive signal on the lead 64 and a field ID signal on the lead 66. A suitable sync generator integrated circuit chip for generating the signals on the leads 58-66 is the MM5321 chip available from the National Semi-Conductor Company. As mentioned, since the sync generator integrated circuit 56 is controlled by the reference strip sync pulses on the lead 42, the output signals of the chips 56 will be in phase with the reference video signal over the lead 36. As a result of the delay in the precision sync strip circuit 38, the reference H-mark pulses on the lead 46 will be 40 nanoseconds behind the horizontal drive pulses on the lead 64. As is known in the art, the field ID pulses on the lead 66 will have their leading edges occuring at the same time as the leading edge of the first equalizer pulse in fields 1 and 3 of the video reference signal on the lead 36.

The reference H-mark pulses on the lead 46, the horizontal drive pulses on the lead 64 and the field ID pulses on the lead 66 are all input into the offset SC lock circuit 48 along with color field ID pulses on the lead 68 from a color field ID circuit 70, to be discussed in connection with FIG. 7. As will be further discussed in connection with FIG. 8, the offset SC lock circuit 48 generates an offset SC signal 24 on the lead 72 which is in phase with the leading edge of the sync pulse 14 and which has a frequency of 3.58 Mhz less 15,750 Hz as shown in FIG. 3.

The reference SC signal on the lead 54 and the offset SC signal on the lead 72 are fed into one side of a dual doubly balanced chroma demodulator integrated circuit 74 such as an MC1324 integrated circuit available from the Motorola Company. The chroma demodulator circuit 74 demodulates the reference SC signal with the offset SC signal and produces an output signal on the lead 76 which is a sine wave having a frequency equal to the difference in the frequencies in the offset SC signal and the reference SC signal, and whose phase is the same as the phase of the reference SC signal with respect to the leading edge of sync. The first sine wave output on the lead 76 is transmitted to a rastor generator circuit 78, and is also transmitted to the color field ID circuit 70 on the lead 80 along with the horizontal drive signal on the lead 82 which is connected to the lead 64. As will be discussed in connection with FIGS. 7, 8 and 9, the color field ID circuit 70 determines if the sine wave signal on the lead 76 crosses the vertical line 28 on the video monitor in the upgoing direction, and, if not, transmits a correction signal over the lead 68 to the offset SC lock circuit 48 to correct the display.

A second or match video signal is received on a lead 84 and is transmitted to a second precision sync strip circuit 86 and a match SC lock circuit 88. The precision sync strip circuit 86 generates a burst control signal on the lead 90 for controlling a phase lock loop in match SC lock circuit 88 which controls a 3.58 Mhz oscillator in the match SC lock circuit 88 to produce a match SC signal on the output lead 92 having a frequency of 3.58 Mhz in phase with the color burst signals in the match video signal. The match SC signal is transmitted over the lead 92 to the second input 94 of the chroma demodulator circuit 74 where it is demodulated with the reference SC signal on the lead 54 generating a second sine wave signal on a second output lead 96 of the chroma demodulator circuit 74. This second output lead 96 is connected to the input of the rastor generator circuit 78 for rastorizing the second sine wave signal on the lead 96 along with the first sine wave signal on the lead 76. The frequency of second sine wave signal is equal to the difference in the frequencies of the reference SC signal on the lead 54 and the match SC signal on the lead 92, and, since it is demodulated with the offset SC signal, its phase is the same as the phase of the match SC signal with respect to the beginning of the sync pulse of the reference video signal on the lead 36.

The horizontal drive signal on the lead 64 is transmitted over the lead 100 to a horizontal ramp circuit 98 which generates a ramp signal on its output 102 in phase with the pulses in the horizontal drive signal output by the sync generator chip 56. The horizontal ramp signal on the output 102 is transmitted by lead 104 to a horizontal comparator circuit 106, and by lead 108 to the rastor generator circuit 78. The second precision sync strip circuit 86 generates a match H-mark signal having a train of pulses generated responsive to the leading edges of the horizontal sync pulses in the match video signal on the lead 84. The horizontal comparator circuit 106 compares the phase of the horizontal ramp signal on the lead 104 with the phase of the match H-mark signal on the lead 110 and generates a DC signal on its output lead 112 which is proportional to the phase difference between the signals on the leads 104 and 110. The horizontal comparator DC signal is transmitted by the lead 112 to the input of the rastor generator circuit 78.

The vertical drive signal on the lead 62 is input into a vertical ramp circuit 114 which is connected to the rastor generator circuit 78 by lead 116. The vertical ramp signal on the lead 116 is in phase with the vertical drive signal on the lead 62 and is used to rastorize the sine wave signals on leads 76 and 96 respectively as is known in the art. The sine wave signal on the lead 76, when rastorized by the vertical ramp signal on the lead 116, produces the first sine wave 26 as shown in FIGS. 4 and 5. The second sine wave signal on the lead 96, when rastorized by the vertical ramp signals, produces the second sine wave 30 as shown in FIG. 5. The rastor generator circuit 78 zero crosses the horizontal ramp signal on the lead 108 to produce the first vertical line 28 in the center of the video display as shown in FIGS. 4 and 5, and compares the horizontal ramp signal on the lead 108 with the horizontal comparator DC signal on the lead 112 to produce the second vertical line 32 shown in FIG. 5. It will be understood that as the horizontal ramp signal on the lead 104 approaches the match H-mark signal on the lead 110, the horizontal comparator circuit 106 will generate a smaller DC voltage on the lead 112, making the second vertical line 32 come closer to the first vertical line 28 until the DC signal on line 112 reaches zero and the vertical lines 32 and 28 are coexistant. The rastorized first and second sine waves and the first and second vertical lines are output by the rastor generator circuit 78 on a display signal lead 118 to a video out circuit 126, to be explained later.

The rastor generator circuit 78 also determines the zero crossing of the vertical ramp signal on lead 116 and generates a zero cross signal on lead 120 which is connected to the input of a horizontal line generator circuit 122 along with the horizontal drive signal on the lead 64. The zero cross signal on the lead 120 indicates that the next two pulses in the horizontal drive signal on the lead 64 are the beginning and end respectively of the horizontal line 34 of FIGS. 4 and 5. The horizontal line generator circuit 122 utilizes these signals to generate a signal for the horizontal line 34 and transmitts it over the lead 124 to the input of the video output circuit 126, along with the display signals on the lead 118 from the rastor generator circuit 78. The regenerated sync signal on the lead 58 from the sync regenerator circuit 44 is input into the video output circuit 126 on lead 128 along with the blanking signal on lead 130, which is connected to the lead 60, for reconstituting a video signal to be displayed on any video monitor. The video signal is output from the video output circuit 126 on lead 132 to a video monitor 134 for display as shown in FIGS. 4 and 5.

As previously mentioned, the RS-170A specifications require that the extended color burst signal cross the leading edge 14 of the sync pulse 12 in the positive going direction in color field 1. Also as previously mentioned, the field ID signal on lead 66 has a pulse corresponding to the beginning of fields 1 and 3 of the reference video signal on the lead 36. It will be understood by those in the art that the first horizontal sync pulse in the field 1 is an odd numbered pulse, and that the first horizontal sync pulse in field 3 is an even numbered pulse. Thus, if the offset SC signal generated by the offset SC lock circuit 48 is locked in phase with the odd numbered sync pulses, the sine wave signals output by the chroma demodulator circuit on the leads 76 and 96 will have the proper phase relationship as specified in the RS-170A specifications. However, if the offset SC signal generated by circuit 48 is locked to even numbered horizontal sync pulses in the reference video signal, the sine wave signals output by the chroma demodulator circuit 74 will be 180° out of phase. If out of phase, the sine wave 26 and 30 displayed on the video monitor will zero cross the horizontal line 34 in the down going rather than the up going direction. Therefore, the color field ID circuit 70 monitors the sine wave signal on lead 76, and if it zero crosses in the down going direction, the circuit 70 generates a signal on the lead 68 causing the offset SC lock circuit 48 to lock its output to every other pulse beginning with the next pulse, shifting the sine wave on line 76 by 180° such that the sine wave 26 zero crosses the horizontal line 34 in the up going direction.

Figure 7:
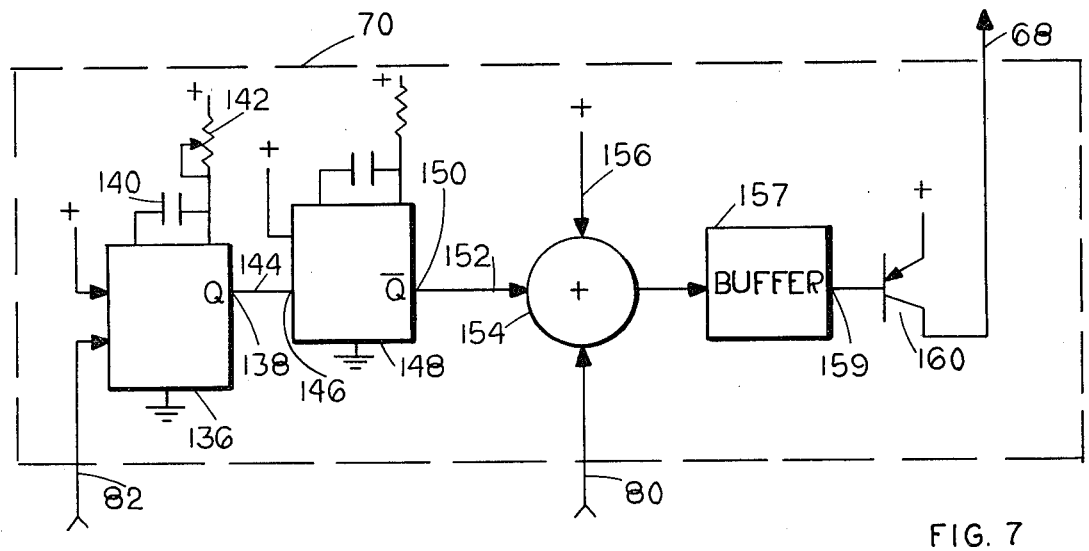
FIG. 7 is a schematic circuit diagram of the color field ID circuit of the device of FIG. 6.

The color field ID circuit 70 is shown in FIG. 7 wherein the horizontal drive pulses on the lead 82 are transmitted to the input of a monostable multivibrator or one-shot circuit 136 which is timed to generate a pulse on its Q output 138 whose width is determined by the value of capacitor 140 and the setting of potentiometer 142 to last for approximately ¾ of the time between the horizontal drive pulses on the lead 82 which are set to occur at about the beginning and ending zero crossings of the sine wave 26 just off the display of the monitor 134. When the Q output 138 of the one-shot circuit 136 returns to its original state, the negative going edge of the pulse on lead 144, which is connected to input 146 of a second one-shot circuit 148, causes a short negative going pulse on the Q output 150 of one-shot circuit 148. The Q output 150 is connected by lead 152 to a summing circuit to be algebraically added to a predetermined positive DC voltage on lead 156 and the instantaneous value of the sine wave signal on the lead 80. The resultant signal is input to a buffer circuit 157 by lead 158 whose output is connected to the base of a transistor 160.

The transistor 160 acts as a negative peak detector and has its collector connected to the color field ID signal lead 68. The threshold voltage of the transistor 160 is such that if the negative going pulse on the lead 152 occurs during the positive half cycle of the sine wave signal on the lead 80, and is added with the predetermined positive DC voltage on the lead 156, the transistor 160 will not conduct and will not generate a correction signal on the lead 68. However, if the negative going pulse on the lead 152 occurs during the negative half cycle of the sine wave signal on the lead 80 and is added with the positive DC voltage on the lead 156, the resultant voltage will be below the threshold voltage of the transistor 160 causing the transistor 160 to conduct and a correction signal to be transmitted over the lead 68 to the offset SC lock circuit 48. The capacitor 140 is sized and the potentiometer 142 is adjusted such that the pulse on the Q output 138 of the one-shot circuit 136 will end when the sine wave signal on the lead 80 should be at or near its positive peak. If the sine wave signal on the lead 80 is at or near its negative peak, the transistor 180 will transmit a correction pulse over the lead 68 causing the offset SC lock circuit 48 to lock its output in phase with every other pulse beginning with the next horizontal pulse, thereby shifting the sine wave signal on lead 80 by 180° to the positive half cycle of the first sine wave signal, as desired.

Figure 8:
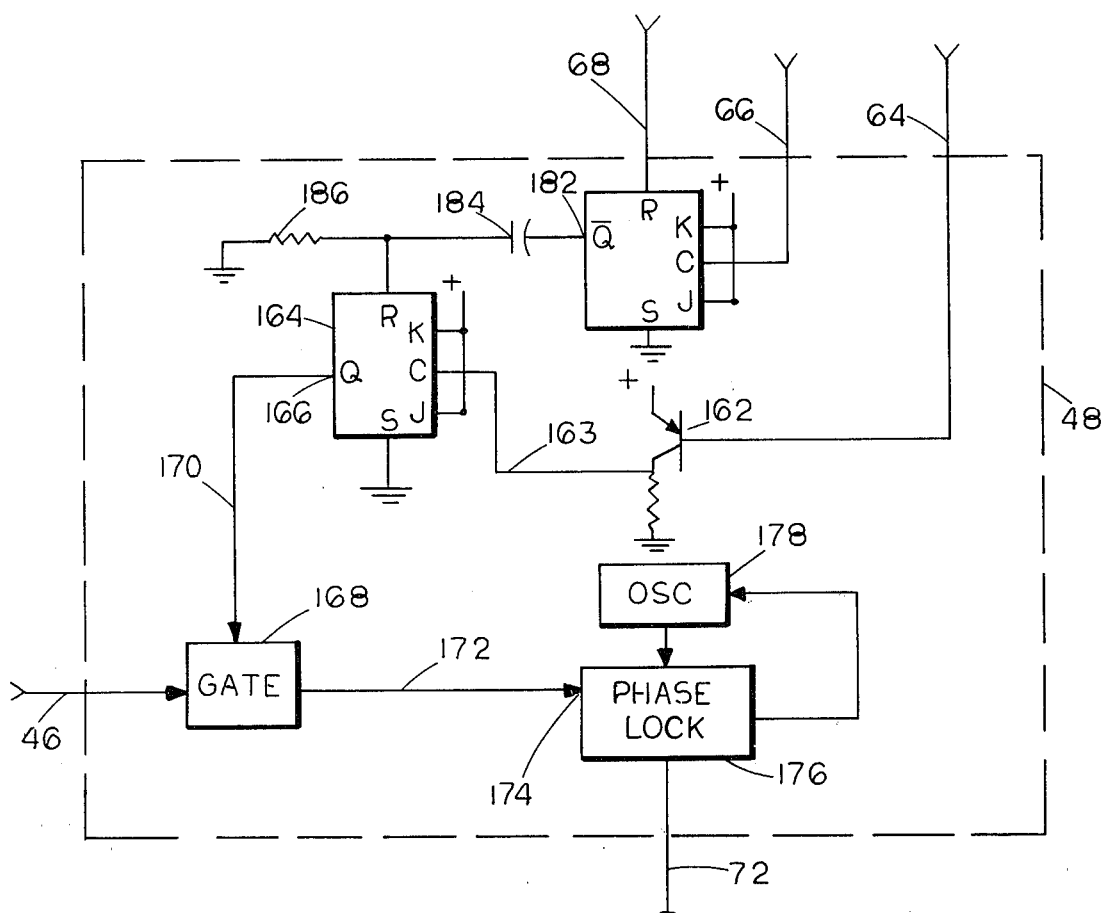
FIG. 8 is a schematic circuit diagram of the offset subcarrier lock circuit of the device of FIG. 6.

The details of the offset SC lock circuit 48 are shown in FIG. 8, and include a signal inverting transistor 162 whose base is connected to the horizontal drive signal on the lead 64 and whose collector is connected by lead 163 to the clock input of a first flip-flop circuit 164. The Q output 166 of the flip-flop 164 is connected to the control input of a gate circuit 168 by the lead 170. The input of the gate circuit 168 is connected to the reference H-mark signal lead 46, and its output 172 is connected to control input 174 of a phase lock loop circuit 176 which controls the phase of an oscillator 178 generating the offset SC signal on the lead 72. Negative going pulses of the horizontal drive signal on the lead 64 are inverted to positive going pulses by the transistor 162, and are input into the clock of the flip-flop 164 on the lead 163. Each pulse applied to the clock causes the state of the Q output 166 to change, thereby controlling the passing of reference H-mark pulses from the lead 46 to the phase lock loop circuit 174 over the lead 172. Because of the previously mentioned delay circuit in the precision sync strip circuit 38, the horizontal drive signal pulses are applied to the clock input of the flip-flop 164 before the reference H-mark pulses are received on the lead 46 at the input terminal of the gate circuit 168. If the initial state of the Q output 166 is low, the horizontal drive pulse received at the clock of the flip-flop 164 will change the Q output to its high state, enabling the gate 168 and passing the slightly delayed reference H-mark pulse on the lead 46 to the phase lock loop 176 over the lead 172. The next horizontal drive signal pulse will change the Q output 166 back to its low state, disabling the gate 168 and blocking the next reference H-mark signal pulse. Thus, every other reference H-mark pulse will be blocked by the gate 168.

The field ID signal on the lead 66 is connected to the clock input of a second flip-flop circuit 180 whose $\overline{Q}$ output 182 is connected to one side of a capacitor 184, whose other side is connected to the reset of the first flip-flop 164 and to one side of a grounded resistor 186. The color field ID signal on the lead 68 is connected to the reset of the second flip-flop 180. As previously discussed, the field ID signal on the lead 66 has a negative going pulse corresponding to the beginning of the first horizontal sync pulse in fields 1 and 3 of the reference video signal on the lead 36. The up-going edge of a pulse in the field ID signal on the clock of the flip-flop 180 changes the state of the $\overline{Q}$ output 182 which is applied to the capacitor 184. It will be understood that because the reset of the flip-flop 164 is grounded through the resistor 186, only the up-going edge of pulses from the $\overline{Q}$ output 182 will cause reset pulses to be applied to the reset of a flip-flop 164. Thus changing the $\overline{Q}$ output 182 of the flip-flop 180 from its high state to its low state will not reset flip-flop 164, and changing the state of the $\overline{Q}$ output 182 from its low state to high state will reset the flip-flop 164. Thus, the flip-flop 164 is reset only on every other pulse in the field ID signal on the lead 66.

In operation, every other reference H-mark pulse will be passed by the gate 168 which is enabled by pulses from the flip-flop 164 which is in turn controlled by the horizontal drive signal pulses on the lead 64. When the circuit 48 is first started up, the first horizontal drive pulse on the lead 64 is not identifiable and may correspond to either an odd numbered pulse or even numbered pulse in the reference video signal. The flip-flop 164 is reset by up going signals from the $\overline{Q}$ output 182 so that the reference H-mark pulse passed by the gate 168 are passed only on every other pulse in the field ID signal on the lead 66. If the field ID pulses on the lead 66 causing up-going signals on the $\overline{Q}$ output 182 are even numbered field 3 pulses, the first sine wave signal on the lead 76 will be 180° out of phase, and the color field ID circuit 70 will transmit a correction pulse over the lead 68 as previously described. Also as described, a color field signal correction pulse received over the lead 68 in this situation will reset the flip-flop 180 such that the $\overline{Q}$ output 182 will thereafter change from its low state to its high state only upon the arrival of odd numbered field 1 field ID pulses at the clock of flip-flop 180.

Figure 9:
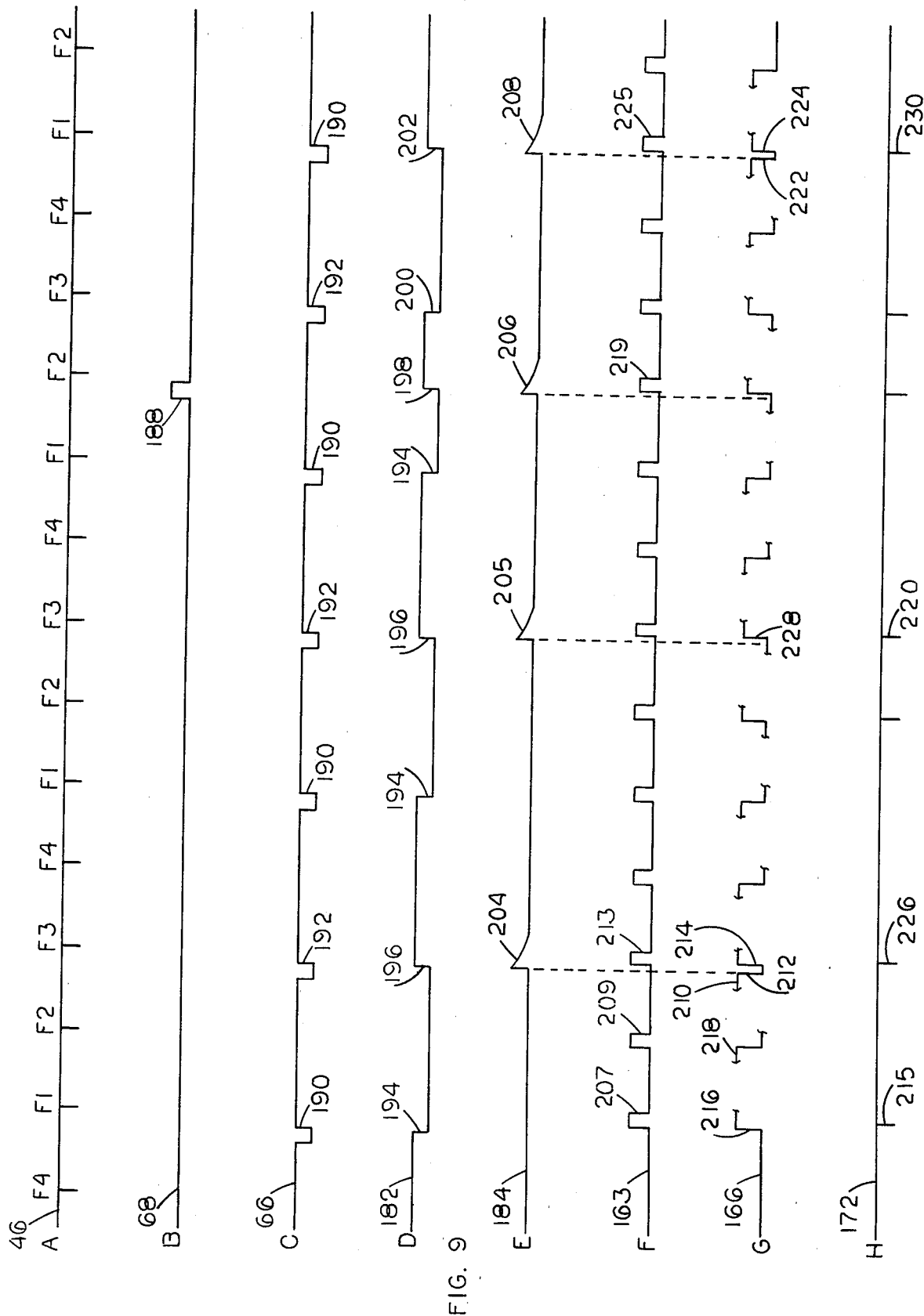
FIG. 9 is a timing diagram of the input and output signals of the circuits of FIGS. 8 and 9.

FIG. 9 is a timing diagram showing the time relationship between the pulses in the various signals of the color field ID circuit 70 and the offset SC lock circuit 48. Each of the lines A–H of FIG. 9 is identified by the reference number of the lead or output terminal on which the signal appears. For instance, line A of FIG. 9 is identified by the reference number 46, and is a representation of the reference H-mark signal present on lead 46.

As is known in the art, color video signals are divided into frames, with each frame having a series of sync pulses divided into four fields. The first horizontal sync pulse in field 1 is number 1, the first horizontal sync pulse in field 2 is number 264, the first horizontal sync pulse in field 3 is number 526, and the first horizontal sync pulse in field 4 is number 789. Line A of FIG. 9 shows only the first reference H-mark pulse corresponding to and delayed from the first horizontal sync pulse in each field of the video signal on the lead 36. Line B of FIG. 9 includes only a single pulse 188 in the color field ID signal on the lead 68, whose timing will be discussed later. Line C of FIG. 9 is the field ID signal on the lead 66 having negative going pulses 190 corresponding to the first horizontal sync pulses in field 1 of the reference video signal on the lead 36, and negative going pulses 192 corresponding to the first sync pulses in field 3 of the reference video signal. Line D of FIG. 9 shows the state of the Q output 182 of the flip-flop 180 and is arbitrarily shown changing from its high state to its low state at 194 with the up-going edge of the first field ID pulse 190, and changing from its high state to its low state at 196 upon the up-going edge of the second field ID pulse 192. The Q output 182 of the flip-flop 180 continues to alternate at 194 and 196 until the pulse 188 of the color field ID signal on the lead 68 resets the flip-flop 180, resetting the Q output 182 to its high state at 198. The next occurrence thereafter of a pulse 192 at the beginning of field 3 then causes the Q output 182 to change from its high state to its low state at 200, changing the operation of the flip-flop 180 such that the Q output 182 goes from its high state to its low state as shown at 200 upon the occurrence of the field 3 pulses 192 and going from its low state to its high state as shown at 202 upon the occurrence of the field 1 pulses 190. As previously described in connection with FIG. 8, the capacitor 184 causes the reset pulses 204 of line E to occur only on the up-going edges 196 of the Q output 182 of the flip-flop 180. The color field ID reset pulse 188 causes a reset pulse 206 to occur in response to the up-going edge 198, and thereafter the reset pulse 208 occurs responsive to the up-going edge 202 at the beginning of the first sync pulse in field 1.

Line F shows the inverted horizontal drive pulses on the lead 163 connected to the clock of the flip-flop 164. As in the case of the reference H-mark pulses shown in line A, only the first pulse corresponding to each field of the video signal is shown. The Q output 166 of the flip-flop 164 is shown in Line G of FIG. 9 as pulse 216 arbitrarily going from its low state to its high state upon the arrival of the inverted horizontal drive pulse 207 over the lead 163. A high state at the Q output 166 is transmitted over the lead 170 to enable the gate 168 allowing the passing of the next arriving reference H-mark pulse shown as pulse 215. The first pulse in field 2 of the video signal corresponding to pulse 209 in line F is an even numbered pulse (number 264) and thus the Q output 166 of the flip-flop 164 goes from its high state to its low state as shown at 218 disabling the gate 168 and blocking the passing of the next arriving reference H-mark pulse. The first pulse in field 3 corresponding to pulse 213 in line F is also an even numbered pulse (number 526), and thus the Q output 166 is in its high state as shown at 210. However, the arrival of the reset pulse 204 resets the flip-flop 164 causing the Q output 166 to change to its low state as shown at 212. The arrival of the next inverted horizontal drive pulse 213 at the clock of flip-flop 164 causes the Q output 166 to change again to its high state as shown at 214, enabling the gate circuit 168 and passing the next arriving reference H-mark pulse shown at 226. It will thus be seen that the off-set SC lock circuit 48 has now changed from passing odd numbered reference H-mark pulses to passing even numbered reference H-mark pulses. When the next reset pulse 205 is received by the flip-flop 164, the Q output 166 is already at its low state as shown at 228, and the reset pulse 205 has no effect. The next inverted horizontal drive pulse 219 changes the Q output 166 to its high state, enabling the gate 168 and passing the next reference H-mark pulse shown at 220.

The color field ID circuit as described in connection with FIG. 7 now determines that the first sine wave signal on the lead 80 is 180° out of phase, and generates, as previously described, the reset pulse 188 on the lead 68 which resets the flip-flop 180 causing the Q output 182 to go to its high state as shown at 198. This results in the reset pulse 206 which, in the illustration of FIG. 9, occurs when the Q output 166 of the flip-flop 164 is in its low state. The effect of the pulse 188 is that the arrival of the next field ID pulse on the lead 66 will change the state of the Q output 182 to a down going rather than up-going transition. At the next up-going transition 202 of the Q output 182, a reset pulse 208 is generated, resetting the flip-flop 164 so that the Q output 166 goes from its high state to its low state at 222. The state of the Q output 166 is almost immediately changed thereafter to its high state at 224 by the arrival of the pulse 225 at the clock of the flip-flop 164, enabling the gate 168 and passing the next arriving reference H mark pulse shown at 230. Thus, from that point on, odd numbered pulses are passed by the gate 168 as desired.

If the reset pulse 206 occurs when the Q output 166 is in its high state rather than its low state as illustrated, the flip-flop 164 resets, resulting in odd numbered pulses being passed from that point on. Thus, the arrival of the color field ID reset pulse 188 is not critical as long as only one pulse is generated to shift the sine wave signal on the lead 80 by 180°. It is now apparent that the described invention generates a correction signal for selecting a desired half cycle of a sine wave in an electrical signal, and also discloses a circuit for distinguishing even numbered sync pulses from odd numbered sync pulses in a video signal. Also disclosed is a device which displays the sync-to-burst phase relationship of a single video signal or of two video signals in a video system for certifying the SCH phasing in each of the video signals.

Thus, there has been shown and described an embodiment of a novel video signal monitoring device which fulfills all of the objects and advantages sought therefor. It will be apparent to those skilled in the art, however, that many changes, modifications, variations, and other uses and applications for the subject device are possible. All such changes, modifications, variations and other uses and applications which do not depart from the spirit and scope of the invention are deemed to be covered by the invention which is limited only by the claims which follow.

What is claimed is:

1. A device for distinguishing odd numbered horizontal sync pulses from even numbered horizontal sync pulses in a video signal in which the horizonal sync pulses are divided into a plurality of frames each of which is further divided into a plurality of fields such that the first horizontal sync pulse in at least one of the fields in a frame is an odd numbered pulse, and the first horizontal sync pulse in at least one of the other fields in a frame is an even numbered pulse, said device comprising:

means operatively connectable to a source of a video signal for generating a train of phasing pulses including a first set of phasing pulses corresponding to the first sync pulses of preselected fields starting with an odd numbered horizontal sync pulse and a second set of phasing pulses corresponding to the first sync pulses of preselected fields starting with an even numbered horizontal sync pulse, each of said second set of phasing pulses being alternately located between individual phasing pulses of said first set;

means having an input operatively connectable to the source of said video signal and an output, said means generating a displayable signal on the output responsive to predetermined elements of the video signal on the input;

means in said displayable signal generating means operatively connected to said phasing pulse generating means for controlling the phase of the output signal thereof including means to maintain the output signal in phase with the pulses of one of the sets of the phasing pulses; and, other means operatively connected to the output of said displayable signal generating means and to said means for controlling phase for generating a correction signal that varies in response to the phase relationship between the output signal of the displayable signal generating means and a selected predetermined time;

said displayable signal generating means being responsive to the correction signal from said correction signal generating means for changing the phase of the output thereof to be in phase with the pulses of the other set of phasing pulses.

2. The device of claim 1 including means operatively connected to the output of said displayable signal generating means for displaying a representation of the output thereof.

3. The device of claim 1 wherein the output generated by the displayable signal generating means is a sine wave.

4. The device of claim 3 wherein the correction signal produced by the correction signal generating means depends on the sine wave being in a selected one of its half cycles.

5. The device of claim 4 wherein the selected half cycle of the sine wave is a negative half cycle.

6. The device of claim 3 wherein the correction signal generating means includes:
- a timing circuit having an input operatively connectable to said video signal source, an output, timing means for producing a time delay following the occurance of horizontal sync pulses in said video signal, and means for generating pulses on the timing circuit output at the end of the time delay;
- a summing circuit having a first input connected to the output of the timing circuit and a second input connected to the output of the displayable signal generating means, and an output;
- and a peak detecting circuit having an input connected to the output of the summing circuit and an output on which the correction signal is produced.

7. The device of claim 6 wherein the peak detector circuit includes a transistor and means establishing a threshold voltage therefor that is below the voltage on the output of the summing circuit during selected half cycles of the sine wave and is above the voltage on the output of the summing circuit during other half cycles of the sine wave, the correction signal being generated by the peak detector circuit whenever the voltage on the output of the summing circuit is below the threshold voltage of the transistor.

8. In means for determining whether a color field locally generated matches the color field of an incoming video signal in order to reorder the local signal so that it matches the color field of the incoming signal the improvement being in a device for distinguishing between positive and negative half cycles of a sine wave signal comprising:
- timing means including means for determining a predetermined time at which a sine wave signal is to be tested to determine if it is in its positive or negative half cycle,
- means for generating pulses to be added to the sine wave signal at the predetermined time;
- said timing means including means for generating a second signal spaced from a known point in every cycle of the sine wave signal,
- said pulse generating means including means to generate said pulses responsive to said second signals at times when the sine wave signal is substantially at one of its peaks;
- signal summing means having inputs connected to receive the generated pulses and the sine wave signal and an output; and,
- means connected to the signal summing means for generating a signal representative of the half cycle of the sine wave signal each time it is tested.

9. The device of claim 8 where the second signal is spaced from a time when the sine wave signal is midway between succeeding positive and negative half cycles.

10. The device of claim 8 including a transistor having a base element operatively connected to the output of the signal summing means, means connected to the transistor for establishing a threshold voltage condition therefor, said threshold voltage condition being a voltage that is less than the voltage on the output of the summing means when the pulse produced occurs during certain half cycles of the sine wave signal, and is greater than the voltage on the output of the summing means if the pulse produced occurs during other half cycles of the sine wave signal.

11. A device for monitoring video signals having a train of sync pulses and intermittent bursts of a subcarrier signal therebetween with a subcarrier burst located between individual ones of said sync pulses, said device comprising:
- a first circuit having an input operatively connectable to a source of a video signal to be monitored, a first oscillator for generating a first continuous signal in phase with the intermittent subcarrier burst signals of the video signal and an output;
- a secod circuit having an input operatively connectable to the source of a video signal to be monitored, a second oscillator for generating a second continuous signal in phase with selected ones of the sync pulses of the video signal and an output;
- a third circuit having a first input connected to the output of the first circuit, a second input connected to the output of the second circuit, said third circuit including means for demodulating the first signal with the second signal to produce a third signal having a phase related to the phase difference between the first and second signals and an output; and,
- means connected to the output of the demodulating means for displaying the third signal.

12. The device of claim 11 wherein the first oscillator has a frequency substantially equal to the frequency of the subcarrier signal of the video signal, the second oscillator has a frequency that differs from the frequency of the first oscillator by some predetermined difference frequency, the frequency of the third signal being equal to the difference frequency, the display means including means for producing a rastor display, and means for displaying at least one cycle of the third signal on the rastor display.

13. The device of claim 11 wherein the third signal varies between positive and negative going peaks, and the device includes a fourth circuit having an input connected to the output of the third circuit and an output, said fourth circuit including means for generating a fourth signal responsive to the magnitude of the third signal at a predetermined time, and means in the second circuit for responding to the fourth signal to select particular video signal sync pulses.

14. The device of claim 11 including a fifth circuit having an input operatively connectable to a second source of a video signal to be monitored, said fifth circuit including a third oscillator for generating a fifth signal in phase with the subcarrier burst signal of the second video signal, said demodulator means including means for demodulating the second signal with the fifth signal to produce a sixth signal having a phase related to the phase difference between the second and fifth signals, and said displaying means being operatively connected to additionally display the sixth signal.

15. A video monitoring device for monitoring a video signal having a subcarrier signal portion and a train of sync pulses, said video monitoring device comprising:

a video monitor including a visual display device for presenting the results of the monitoring;

signal generating circuit means having an input operatively connectable to a video signal to be monitored, an output connected to the video monitor, and means generating a signal response representative of the subcarrier signal portion for displaying the subcarrier signal on said video as a sine wave; and, selecting circuit means having an input operatively connected to the video signal, means for selecting particular pulses in said train of sync pulses, and means generating a signal representative of a selected one of said sync pulses for display on the video monitor as a vertical line having a phase relationship to said sine wave that is representative of the phase relationship between the subcarrier signal and the selected sync pulse.

16. The video monitoring device of claim 15 wherein said signal generating circuit means has a second input operatively connected to a second video signal to be monitored, said second video signal having a subcarrier signal portion and a train of sync pulses, and means generating signal responses representative of the subcarrier signal portion of said second video signal for diaplay on said video monitor, said second video signal subcarrier portion being represented as a second sine wave on said video monitor, the phase relationship between the second and the aforementioned sine waves being represented on the display device as the phase relationship between the subcarrier signal portion of the first video signal and the subcarrier signal portion of the second video signal.

17. The video monitoring device of claim 16 including a second selecting circuit means having an input operatively connected to said second video signal and including means selecting particular pulses in the train of sync pulses of said second video signal, an output operatively connected to said video monitor, and means generating a signal representative of a selected one of said second video signal sync pulses for display as a second vertical line on said video monitor whose location on said video monitor has a relationship to said first vertical line that is representative of the phase relationship between the selected sync pulses of the second video signal and the selected sync pulses of the aforesaid video signal.

18. A device for monitoring the phase relationship between an intermittent portion of an electric signal and a selectable point in the signal that exists when the intermittent signal portion does not exist comprising:

means for generating a first continuous signal in phase with the intermittent signal portion, said means having an input connectable to a source of a signal to be monitored and an output;

means for generating a second continuous signal having a predetermined phase relationship with a selectable point in the monitored signal which is a point that occurs at a time when the intermittent signal portion does not exist, said means having an input connectable to the source of the signal to be monitored and an output; and, means having a first input connected to the output of said first signal means and a second input connected to the output of said second signal means for demodulating said first signal with said second signal to produce a third signal representative of the relationship between the intermittent signal portion to the selectable point.

19. The device of claim 18 including means having an input operatively connected to the demodulating means for visually displaying the third signal as a sine wave whose phase is representative of the relationship between the intermittent signal portion to the selectable point.

20. The device of claim 18 including means having an input operatively connected to the demodulating means for controlling the selection of the selectable point in the monitored signal dependent on the polarity of the third signal at a predetermined time.

21. In a television station having means for generating video signals each formed by a train of odd and even numbered horizontal sync pulses defined between leading and trailing edges, and intermittent color burst portions located between succeeding horizontal sync pulses, the improvement comprising:

a video monitor having means for displaying one of the edges of a selected horizontal sync pulse as a vertical line;

means for selecting the odd numbered horizontal sync pulses from the sync pulses in the video signal;

means for displaying on the video monitor the phase relationship between the video signal color burst signal portion and a selected one of the edges of odd numbered sync pulses on the video monitor as a sine wave whose phase relationship with respect to the vertical line is representative of the color burst to horizontal sync pulse phasing; and, means to adjust the color burst to horizontal sync pulse phasing of the video signal to establish a condition where the displayed sine wave intersects the displayed vertical line half way between successive peaks of the sine wave.

22. The improvement of claim 21 including:

means for displaying one of the edges of the horizontal sync pulses of a second video signal as a second vertical line on the video monitor;

means for displaying the phase relationship between the color burst signal portions of the second video signal and the odd numbered sync pulses of the first mentioned video signal on the video monitor as a second sine wave whose phase with respect to the first mentioned vertical line is representative of the phase relationship between the color burst of the second video signal and the video sync pulses of the first mentioned video signal; and, means for adjusting the second video signal until the aforesaid vertical line and the second vertical line as well as the displayed sine waves respectively overlay each other.

23. A method for distinguishing odd numbered horizontal sync pulses from even number horizontal sync pulses in a video signal in which the horizontal sync pulses are divided into a plurality of frames each of which is further divided into a plurality of fields such that the first horizontal sync pulse in at least one of the fields in a frame is an odd numbered pulse, and the first horizontal sync pulse in at least one of the other fields in a frame is an even numbered pulse, said method comprising:

generating a train for phasing pulses including a first set of phasing pulses corresponding to the first sync pulses of preselected fields starting with an odd numbered horizontal sync pulse and a second set of phasing pulses corresponding to the first sync pulses of preselected fields starting with an even numbered horizontal sync pulse, each pulse of said second set of phasing pulses being alternately located between individual phasing pulses of said first set;

generating a displayable signal representing selected elements of the video signal;

controlling the phase of said displayable signal to maintain it in phase with the pulses of one of the sets of the phasing pulses;

generating a correction signal responsive to the phase relationship between the displayable signal and some predetermined time; and, adjusting the phase of the displayable signal to be in phase with the pulses of the other set of phasing pulses due to the presence of the generated correction signal.

24. The method of claim 23 including displaying a representation of the displayable signal.

25. The method of claim 23 wherein the displayable signal is a sine wave.

26. The method of claim 25 wherein the correction signal is generated whenever the sine wave is in a selected one of its half cycles.

27. The method of claim 26 wherein the selected half cycle of the sine wave is a negative half cycle.

28. The method of claim 25 wherein the step of generating the correction signal includes:
  generating a pulse beginning at a predetermined time after the conclusion of each of the horizontal sync pulses of said video signal;
  summing the voltage of each of the generated pulses with the voltage of the displayable signal; and,
  generating a correction signal that varies with the output of the summing step.

29. In means for determining whether a color field locally generated matches the color field of an incoming video signal in order to reorder the local signal so that it matches the color field of the incoming signal the improvement residing in a method for distinguishing between positive and negative half cycles of a sine wave signal in a T.V. broadcast station comprising:
  generating a pulse at a predetermined time of the sine wave signal whose positive and negative half cycles are to be distinguished;
  summing the voltage of the pulse with the voltage of the sine wave signal at said predetermined time;
  generating a first electrical signal responsive to the voltage on the output of the summing means, said first electrical signal being representative of the half cycle of the sine wave signal at a predetermined time, said summing step including generating a second electrical signal spaced from a known point in every cycle of the sine wave signal; and,
  in response to said second signal, generating the aforesaid pulses at times when the sine wave signal is substantially at one of its peaks.

30. The method of claim 29 wherein the predetermined point in the sine wave at which the second signal is generated occurs at a location equidistant between adjacent sine wave peaks.

31. A method of monitoring a video signal that is formed by a train of sync pulses and intermittent bursts of a subcarrier signal with one of said bursts located between adjacent sync pulses, said method comprising:

generating a first continuous signal in phase with the intermittent subcarrier burst signals of the video signal;

generating a second continuous signal in phase with selected ones of the sync pulses of the video signal;

demodulating the first signal with the second signal to produce a third signal representative of the phase difference between the first and second signals; and, displaying the third signal to visually represent the phase difference between the subcarrier burst signals and the selected sync pulses.

32. The method of claim 31 wherein the first signal has a frequency substantially equal to the subcarrier signal frequency of the video signal, the second signal has a frequency that differs from the frequency of the first signal by a predetermined frequency, the third signal having a frequency equal to the difference in the frequencies of the first and second signals, and the displaying step includes displaying the third signal in conjunction with a video rastor format wherein the rastor frequency is substantially equal to the predetermined frequency.

33. The method of claim 31 including generating a fourth signal responsive to a polarity of the third signal at a predetermined time; and,
  controlling which video signal sync pulses the second signal is in phase with under control of the fourth signal.

34. The method of claim 31 including generating a fifth continuous signal in phase with the intermittent subcarrier burst signals of a second video signal, demodulating the second signal with the fifth signal to produce a sixth signal representative of the phase difference between the second and fifth signals, said displaying step including displaying the sixth signal to thereby visually represent the phase difference between the subcarrier burst signals of the second video signal and the selected sync pulses of the aforementioned video signal.

35. A method for monitoring a video signal having a subcarrier signal portion and a train of sync pulses each having a leading and a trailing edge, said method comprising:
  representing the subcarrier signal portion of the video signal as a sine wave;
  selecting particular pulses of the train of sync pulses for monitoring purposes; and,
  representing one of the edges of the selected pulses as a vertical line on a video display device, the relative locations on the display device of the vertical line and the sine wave being representative of the phase relationship between the selected pulses and the subcarrier signal in the video signal being monitored.

36. The method of claim 35 including monitoring a second video signal having a subcarrier signal portion and a train of sync pulses each pulse of which has a leading and a trailing edge; and,
  representing the subcarrier signal portion of said second video signal as a second sine wave on the video display device, the second sine wave and the aforementioned sine wave having a phase relationship representative of the phase relationship between the subcarrier signal portion of the aforementioned video signal and the subcarrier signal portion of the second video signal.

37. The method of claim 36 including selecting particular pulses in said train in sync pulses of said second video signal;

and representing corresponding edges of the selected pulses as a second vertical line on the video monitor, the relative locations on the display device of the second vertical line and the first vertical line being representative of the phase relationship between the selected pulses of the first video signal and the selected pulses of the second video signal.

38. A method for monitoring the phase relationship of an intermittent portion of an electrical signal to a selectable point in the signal which is present at a time when the intermittent signal portion does not exist comprising:

generating a first continuous signal in phase with the intermittent signal portion;

generating a second continuous signal having a predetermined phase relationship with a selectable point in the monitored signal which is present at a time when the intermittent signal portion does not exist; and, demodulating said first signal with said second signal to produce a third signal representative of the phase relationship between the intermittent signal portion and the selectable point in the monitored signal.

39. The method of claim 38 including visually displaying the third signal as a sine wave whose phase with respect to a point in the visual display is representative of the relationship between the intermittent signal portion and the selectable point in the monitored signal.

40. The method of claim 38 including selecting the selectable point in the monitored signal dependant on the polarity of the third electrical signal at a predetermined time.

41. In the method of generating television video signals each formed by a train of odd and even numbered horizontal sync pulses defined between leading and trailing edges, and intermittent color burst portions located between succeeding horizontal sync pulses, the steps of:

displaying one of the edges of selected horizontal sync pulses as a vertical line;

displaying the phase relationship between the video signal color burst signal portion and a selected one of the edges of odd numbered sync pulses as a sine wave whose phase relationship with respect to the vertical line is representative of the color burst to horizontal sync pulse phasing; and, adjusting the color burst to horizontal sync pulse phasing of the video signal to establish a condition where the displayed sine wave intersects the displayed vertical line half way between successive peaks of the sine wave.

42. In the method of claim 41 the further steps of:

displaying one of the edges of the horizontal sync pulses of a second video signal as a second vertical line;

displaying the phase relationship between the color burst signal portions of the second video signal and the odd numbered sync pulses of the first mentioned video signal as a second sine wave whose phase with respect to the first mentioned vertical line is representative of the phase relationship between the color burst of the second video signal and the video pulses of the first mentioned video signal; and, adjusting the second video signal until the aforesaid vertical line and the second vertical line as well as the displayed sine waves respectively overlay each other.

* * * * *

UNITED STATES PATENT OFFICE
CERTIFICATE OF CORRECTION

Patent No. 4,388,637            Dated June 14, 1983

Inventor(s) Bruce A. Blair

It is certified that error appears in the above-identified patent and that said Letters Patent are hereby corrected as shown below:

Column 14, line 23, "secod" should be --second--.

Column 15, line 29, "diaplay" should be --display--.

Column 19, line 2, "in" (second occurrence) should be --of--.

Column 20, line 31, insert "sync" after video.

Signed and Sealed this

Ninth Day of August 1983

[SEAL]

Attest:

GERALD J. MOSSINGHOFF

Attesting Officer      Commissioner of Patents and Trademarks